United States Patent
Makurin et al.

(10) Patent No.: US 10,574,358 B2
(45) Date of Patent: Feb. 25, 2020

(54) HIGH-FREQUENCY SIGNAL TRANSMISSION/RECEPTION DEVICE

(71) Applicant: Samsung Electronics Co., Ltd., Suwon-si, Gyeonggi-do (KR)

(72) Inventors: Mikhail Nikolaevich Makurin, Arkhangelsk (RU); Artem Rudolfovitch Vilenskiy, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/883,805

(22) Filed: Jan. 30, 2018

(65) Prior Publication Data

US 2018/0219628 A1    Aug. 2, 2018

(30) Foreign Application Priority Data

Jan. 31, 2017   (RU) .................................. 2017103136
Oct. 16, 2017   (KR) ......................... 10-2017-0134169

(51) Int. Cl.
*H04B 10/00*    (2013.01)
*H01Q 9/00*    (2006.01)
(Continued)

(52) U.S. Cl.
CPC ............... *H04B 10/40* (2013.01); *H01Q 3/01* (2013.01); *H01Q 3/44* (2013.01); *H01Q 5/22* (2015.01);
(Continued)

(58) Field of Classification Search
USPC ........................................ 343/700, 795, 745
See application file for complete search history.

(56) References Cited

U.S. PATENT DOCUMENTS 3,754,270 A    8/1973   Thies, Jr.
4,513,292 A  * 4/1985   Bowman ................ H01Q 9/285
                                                           343/795
(Continued)

FOREIGN PATENT DOCUMENTS

JP         2006-054643 A     2/2006
JP           5606338 B2     10/2014
(Continued)

OTHER PUBLICATIONS

International Search Report dated May 2, 2018 in connection with International Patent Application No. PCT/KR2018/001233.
(Continued)

*Primary Examiner* — David C Payne
*Assistant Examiner* — Pranesh K Barua

(57) ABSTRACT

The present disclosure relates to radio engineering, and more specifically to high-frequency (HF) signal transmission/reception devices based on photoconductive switching elements. An HF signal transmission/reception device comprises a signal electrode with matching elements disposed along an edge thereof; a ground electrode, a dielectric layer between the signal electrode and the ground electrode, photoconductive elements (PE) each electrically connected to the signal electrode and the ground electrode and arranged in a grid, an excitation signal feed point, and load elements electrically connected to the matching elements. The photoconductive elements each have a switched-off state in the absence of a control light flux and a switched-on state in the presence of a control light flux, The switched-on photoconductive elements form a reflection profile of the signal supplied from the excitation signal feed point. The distance between adjacent photoconductive elements is less than half the wavelength of the excitation signal.

19 Claims, 15 Drawing Sheets

(51) Int. Cl.
*H01Q 9/28* (2006.01)
*H04B 10/40* (2013.01)
*H01Q 5/22* (2015.01)
*H04Q 11/00* (2006.01)
*H01Q 3/01* (2006.01)
*H01Q 3/44* (2006.01)
*H01Q 19/13* (2006.01)
*H01Q 15/14* (2006.01)
*H01Q 21/20* (2006.01)
*H01Q 9/30* (2006.01)
*G02B 6/12* (2006.01)
*G02B 6/10* (2006.01)
*H01Q 3/24* (2006.01)
*H01Q 3/20* (2006.01)

(52) U.S. Cl.
CPC ......... *H01Q 15/147* (2013.01); *H01Q 19/138* (2013.01); *H01Q 21/20* (2013.01); *H04Q 11/0005* (2013.01); *G02B 6/107* (2013.01); *G02B 6/12002* (2013.01); *H01Q 3/20* (2013.01); *H01Q 3/24* (2013.01); *H01Q 9/30* (2013.01); *H04Q 2011/0035* (2013.01)

(56) References Cited

U.S. PATENT DOCUMENTS

| | | | | |
|---|---|---|---|---|
| 6,366,254 B1* | 4/2002 | Sievenpiper | | H01Q 1/3275 343/770 |
| 7,173,385 B2 | 2/2007 | Caporaso et al. | | |
| 7,965,249 B1* | 6/2011 | Wolf | | H01Q 9/0442 343/700 MS |
| 8,957,441 B2 | 2/2015 | Jun et al. | | |
| 9,019,165 B2* | 4/2015 | Shtrom | | H01Q 1/38 343/795 |
| 9,570,799 B2* | 2/2017 | Shtrom | | H01Q 3/446 |
| 2002/0113739 A1* | 8/2002 | Howard | | H01Q 1/243 343/702 |
| 2004/0041741 A1 | 3/2004 | Hayes | | |
| 2006/0038735 A1* | 2/2006 | Shtrom | | H01Q 3/24 343/795 |
| 2006/0109191 A1* | 5/2006 | Shtrom | | H01Q 1/38 343/795 |
| 2006/0192720 A1* | 8/2006 | Shtrom | | H01Q 1/38 343/795 |
| 2008/0258993 A1* | 10/2008 | Gummalla | | H01Q 1/243 343/876 |
| 2010/0103065 A1* | 4/2010 | Shtrom | | H01Q 3/24 343/795 |
| 2013/0249751 A1 | 9/2013 | Legare | | |
| 2015/0349418 A1* | 12/2015 | Patron | | H01Q 3/24 343/836 |

FOREIGN PATENT DOCUMENTS

KR 10-2008-0059579 A 6/2008
KR 10-2012-0049128 A 5/2012

OTHER PUBLICATIONS

Written Opinion of the International Searching Authority dated May 2, 2018 in connection with International Patent Application No. PCT/KR2018/001233.
European Patent Office, "Supplementary European Search Report," Application No. EP 18747447.3, dated Oct. 10, 2019, 11 pages.

* cited by examiner

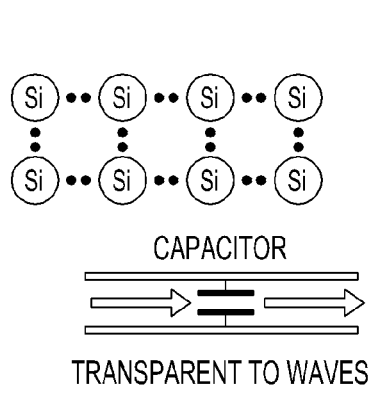
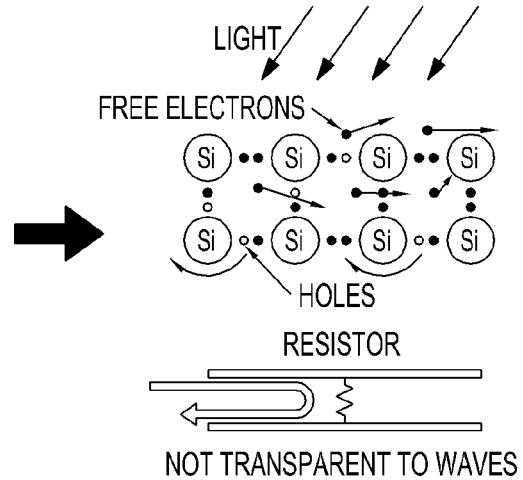
FIG.1A  FIG.1B
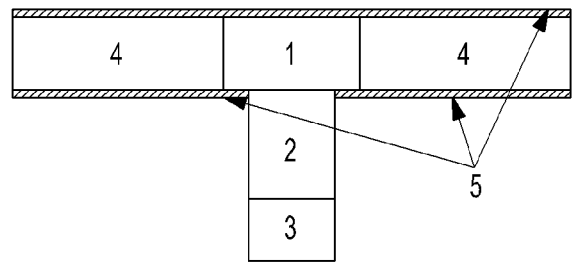
FIG.2
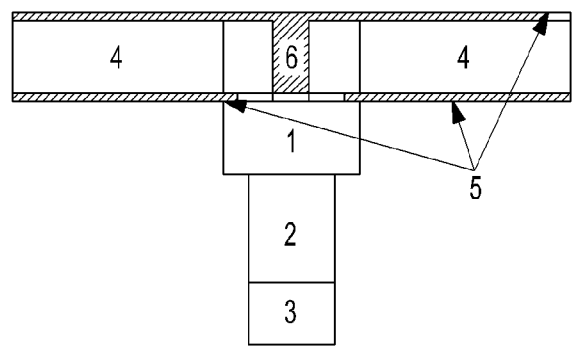
FIG.3

SWITCH-OFF STATE
(NO LIGHT, LOW CONDUCTIVITY),
TRANSPARENT TO HF SIGNAL

SWITCH-ON
(LIGHT EXISTING, HIGH CONDUCTIVITY),
REFLECTIVE OF HF SIGNAL hexagonal rectangular

HIGH-FREQUENCY SIGNAL TRANSMISSION/RECEPTION DEVICE

CROSS-REFERENCE TO RELATED APPLICATION

This application is related to and claims priority to Russian Patent Application No. 2017103136, filed on Jan. 31, 2017 and Korean Patent Application No. 10-2017-0134169, filed on Oct. 16, 2017, the contents of which are incorporated herein by reference.

TECHNICAL FIELD

Various exemplary embodiments of the present disclosure relate to a high-frequency signal transmission/reception device based on photoconductive elements (PE).

BACKGROUND

The constantly increasing demands of users have stimulated the rapid development of mobile communication technologies. Currently, 5G mmWave (millimeter-wave) networks are actively being developed. 5G mmWave networks may require higher performance due to user experience requirements, including such factors as ease of connectivity with nearby devices and improved energy efficiency. Millimeter-wave technologies encounter a variety of fundamental challenges, which are associated with the physics of antenna arrays, the structure of a high-speed transceiver, etc.

The basic challenges and constraints affecting current radio-frequency (RF) signal transmission/reception devices (switches, phase shifters, antennas) with operating frequencies over 5 GHz are as follows:

1) high losses encountered in the use of standard semiconductor technologies, which results in low energy efficiency;

2) off-the-shelf components and circuits having low parasitic characteristics are sophisticated or large and have a high cost.

Previously, the use of known photoconductive elements in high-frequency signal transmission/reception devices at these frequencies has been impractical because of the inherent disadvantages thereof:

1) high losses;
2) large amount of power required for control;
3) large surface area required for irradiation.

For example, the following high-frequency switching devices using optical elements are known.

U.S. Pat. No. 7,965,249 B1, Jun. 21, 2011, "Reconfigurable radio frequency (RF) surface with optical bias for RF antenna and RF circuit applications", Rockwell Collins.

This document discloses a reconfigurable radio-frequency surface with optical bias for application in RF antennas and RF circuits. The surface is a multicell structure (grid) of metallic squares connected by photoconductive compounds. This structure controls antennas (by frequency or polarization).

The disadvantage of this solution is a great number of photoconductive pixels needed in order for the device to provide acceptable scan characteristics.

US 2015/349418, Mar. 12, 2015, "Wide band reconfigurable planar antenna with omnidirectional and directional radiation patterns", UNIV DREXEL [US], ADANT TECHNOLOGIES INC [US].

The document discloses a wide-band reconfigurable planar antenna with omnidirectional and directional radiation patterns, in which switching is performed between dipoles at a feed point.

SUMMARY

To address the above-discussed deficiencies, it is a primary object to provide a high-frequency signal transmission/reception device based on photoconductive elements. Existing signal transmission/reception devices entail a large loss due to the use of photoconductive elements and require large power for control and a large surface for irradiation, so they are impractical.

Accordingly, there is a need in this technical field for a high-frequency transmission/reception device including an operational frequency of 5 GHz or more that experiences less loss, requires little control power, and is inexpensive. As described above, the existing technologies are not suitable for developing devices that can satisfy all of these requirements.

Various embodiments of the present disclosure can provide a high-frequency transmission/reception device based on switching photoconductive elements to overcome at least some of the drawbacks in the related art.

According to the present disclosure, there is provided a high-frequency signal transmission/reception device, which includes: a signal electrode that includes the form of a flat conductive plate and includes a plurality of matching elements disposed along the edge thereof, a ground electrode that includes the form of a flat conductive plate and is disposed parallel to the signal electrode, a dielectric layer between the signal electrode and the ground electrode (the dielectric layer may be filled with air or may be in a vacuum state), a plurality of photoconductive elements, each of which is electrically connected to the signal electrode and the ground electrode and is arranged in a grid; an excitation signal feed point, and a plurality of load elements that are electrically connected to the plurality of matching elements, in which the photoconductive elements may be included at least in two states that may include a dielectric state with a low intrinsic electrical conductivity (switched-off state) in the absence of a control light flux, and a conductor state with a relatively high electrical conductivity (switched-on state) in the presence of a control light flux, the photoconductive elements in the grid may be arranged such that the photoconductive elements, to which a control light flux is applied at given instant, form a curve close to a desired reflection profile of an excitation signal supplied from the excitation signal feed point, the distance between adjacent photoconductive elements may be less than half of the wavelength of the excitation signal, and at least one of the signal or ground electrodes may include a hole for providing control light fluxes to the photoconductive elements or for mounting conductive elements that connect the photoconductive element with another electrode.

In an exemplary embodiment, the device may further include: a plurality of dielectric transparent splitters including dielectrics, each of which is connected to a respective photoconductive element, and a plurality of light sources, each of which is connected to a respective splitter so that radiated light from the plurality of light sources, passing through the respective splitter, falls on a respective photoconductive element.

In an exemplary embodiment, the device may further include: a plurality of optical waveguides, each of which is connected to a respective photoconductive element, and a plurality of light sources, each of which is connected to a respective optical waveguide so that radiated light from the plurality of light sources, passing through the optical waveguide, falls on a respective photoconductive element.

In an exemplary embodiment, the signal electrode may include the shape of a circle, a polygon or a circular sector.

In an exemplary embodiment, wherein the plurality of matching elements each may include a saw tooth shape.

In an exemplary embodiment, the load element may be a monopole quarter-wave radiator, the device may be an antenna, and the ground electrode may extend beyond the signal electrode by a distance useful for operation of the radiator.

In an exemplary embodiment, the load elements may be transmission line or a high-frequency connectors, and the device may include a multipole device with controllable phase distribution at its output ports.

In an exemplary embodiment, at least one photoconductive element may be connected to the signal electrode via a conductive jumper that is connected to the signal electrode, may pass through a hole in the dielectric layer or the ground electrode, and may not be in contact with the ground electrode.

In an exemplary embodiment, at least one photoconductive element may be disposed in a hole in the dielectric layer and may include a thickness equal to the thickness of said dielectric layer, and the ground electrode may include a hole to provide a control light flux to at least one photoconductive element.

In an exemplary embodiment, the signal electrode, the ground electrode and the dielectric layer between them may represent, respectively, a signal plane, a ground plane and a substrate of a planar structure.

Further, according to the present disclosure, there is provided a three-dimensional antenna that includes at least two flat antennas, flat sides of which face each other, and includes the form of a high-frequency signal transmission/reception device, and the three-dimensional antenna may scan in a plane perpendicular to the plane of the flat antennas by supplying the same signal with a different phase shift to different flat antennas including the same reflection profile.

Further, according to the present disclosure, there is provided a high-frequency signal transmission/reception device, which includes: a signal electrode that is made in the form of a flat conductive plate, a ground electrode that includes the form of a flat conductive plate and is disposed parallel to the signal electrode, a dielectric layer that is disposed between the signal electrode and the ground electrode and includes a thickness of not less than a quarter wavelength of the signal to be transmitted/received, a plurality of photoconductive elements that are arranged in holes in the dielectric layer and arranged in a grid, a plurality of optical waveguide portions, each of which is in contact with a respective photoconductive element across the thickness of the dielectric layer and provides a control light flux thereto, and an excitation signal feed point, in which the photoconductive elements are each electrically connected to the signal electrode and the ground electrode, includes a thickness equal to the thickness of the dielectric layer, are include at least in states, and includes a dielectric state with a low intrinsic electrical conductivity (switched-off state) in the absence of a control light flux, and a conductor state with a relatively high electrical conductivity (switched-on state) in the presence of a control light flux, the photoconductive elements in the grid are arranged such that the photoconductive elements, to which a control light flux is applied, form a curve close to a desired reflection profile of the signal supplied from the excitation signal feed point, the distance between adjacent photoconductive elements is less than half of the wavelength of the excitation signal, and at least one of the electrodes includes holes to supply optical waveguides to the photoconductive elements.

In an exemplary embodiment, the device may further include a plurality of light sources, each of which is connected to a respective optical waveguide portion so that the radiated light, passing through the optical waveguide, falls on its respective photoconductive element.

In an exemplary embodiment, discontinuities and/or notches may be provided on optical waveguide portions in the place of contact with a photoconductive element.

The present disclosure can realize not only low loss, low control power, and low cost without sacrificing the gain of an antenna, but also scanning/creation of desired phase distribution at output ports of a device including low requirements for power control.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 1A and 1B are views illustrating an operating principle of a photoconductive element according to various exemplary embodiments of the present disclosure;

FIG. 2 is a view illustrating a first embodiment of connection of a photoconductive element according to various exemplary embodiments of the present disclosure;

FIG. 3 is a view illustrating a second embodiment of connection of a photoconductive element according to various exemplary embodiments of the present disclosure;

DETAILED DESCRIPTION

Figure 4:
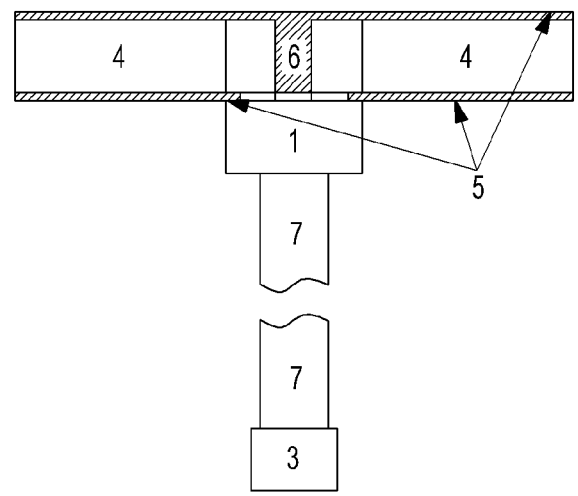
FIG. 4 is a view illustrating a third embodiment of connection of a photoconductive element according to various exemplary embodiments of the present disclosure.

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

FIGS. 1A and 1B illustrate the operating principle of a photoconductive element. As described above, the present disclosure is based on switching between two states of a photoconductive element: a dielectric state with a low intrinsic electrical conductivity (switched-off state) and a conductor state with a relatively high electrical conductivity arising under the effect of light (switched-on state). As illustrated in FIG. 1A, in the switched-off state, the structure of a photoconductive element is stable and nonconductive; the photoconductive element (PE) has, in general, capacitive properties and is transparent to radio waves passing through it. As illustrated in FIG. 1B, in the switched-on state, when the photoconductive element is irradiated by light, some electrons leave their orbits, whereby the conductivity of the photoconductive element increases, and it exhibits generally resistive properties, so it may not be transparent to the radio waves falling on it (that is, it reflects radio waves). An example of a material for the photoconductive element is silicon.

FIG. 2 illustrates a first exemplary embodiment of connection (installation) of a photoconductive element. According to the first exemplary embodiment of connection of a photoconductive element, a photoconductive element 1 is disposed between conductive plates 5 and is in electrical contact therewith. The photoconductive element 1 is connected to a transparent splitter 2 including a dielectric (for example, quartz). Control light is supplied to the photoconductive element 1 from a light source 3 connected to the transparent splitter 2 and may be directed at least towards the photoconductive element 1. The transparent splitter 2 is used to reduce the effect of control circuits and the light source 3 on the photoconductive element 1. One conductive plate 5 may be further referred to as a "signal electrode", and the other as a "ground electrode". The space between the conductive plates may be filled with a dielectric layer 4. The signal electrode, the ground electrode and the dielectric layer between the electrodes may be a signal plane, a ground plane and a circuit board substrate, respectively. The photoconductive element 1 may be made of the photoconductive material described above in connection with FIGS. 11A and 1B. The light source may be an LED (a simple and energy-efficient light source), a laser (which is a more directional, but more complicated and less energy-efficient light source than an LED), etc. The light source 3 or the transparent splitter 2 may be integrated in a single element. In a standard version, the thickness of the photoconductive element 1 may be the same as the thickness of the dielectric layer 4.

FIG. 3 illustrates a second exemplary embodiment of connection of a photoconductive element, in which the photoconductive element is mounted on the surface of a printed circuit board. According to the second exemplary embodiment of connection, the same elements as in the first exemplary embodiment are mounted and used on a photoconductive element, but the photoconductive element 1 may adjoin the ground electrode outside the printed circuit board, and may not adjoin the signal electrode. For contact between the photoconductive element 1 and the signal electrode, the signal electrode may be connected with the photoconductive element 1. Further, the contact may be provided by a conductive jumper 6 passing through a hole in the dielectric layer 4 and the ground electrode without coming in contact with the ground electrode.

FIG. 4 illustrates a third exemplary embodiment of connection of a photoconductive element, in which a light source 3 is disposed at a distance from the photoconductive element 1, i.e. at a distance from a printed circuit board. The third exemplary embodiment of connection of a photoconductive element may differ from the second exemplary embodiment in that an optical fiber 7 is used instead of the transparent splitter 2. Accordingly, the control circuit may be spaced apart from the switch at a relatively great distance.

A fourth exemplary embodiment (not shown) of connection of a photoconductive element may differ from the first exemplary embodiment in that an optical fiber 7 is used instead of the transparent splitter.

Figure 5:
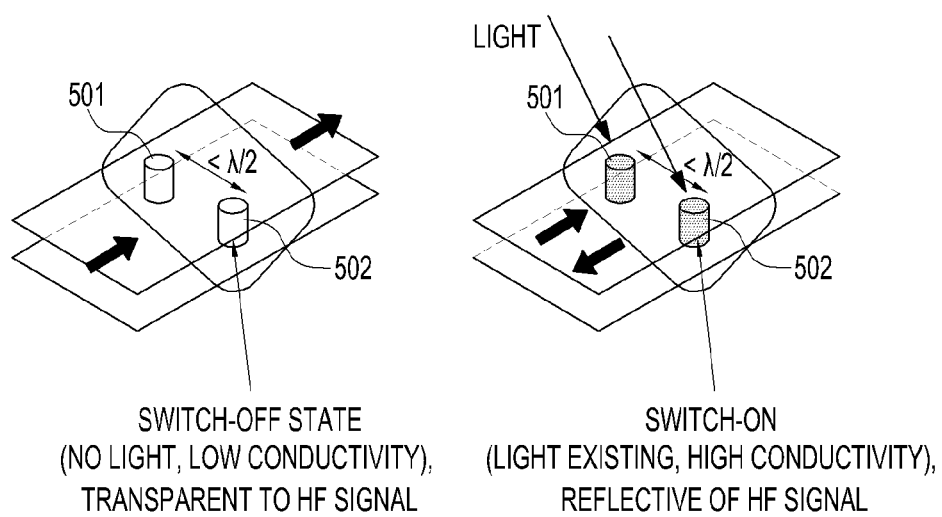
FIG. 5 is a view illustrating a first exemplary embodiment of a one-dimensional RF signal transmission/reception device according to various exemplary embodiments of the present disclosure.

FIG. 5 illustrates a first basic exemplary embodiment of an RF structure for receiving/transmitting signals according to the present disclosure. Two photoconductive elements 501 and 502 are disposed between two conductive plates (e.g. in a printed circuit board) and each may be in electrical contact with both conductive plates. The distance between the photoconductive elements 501 and 502 is less than half of the length of a radio frequency (RF) wave (signal) passing through them, and the photoconductive elements may be in contact with each other. Control is applied to the photoconductive elements in the form of a light flux (beam). In the absence of applied control light, the photoconductive elements are in a switched-off state and include a high impedance, so they may transmit the RF wave. That is, when the photoconductive elements are switched off, they may be transparent to an RF signal passing through the switch. In the presence of applied control light, the photoconductive elements are in a switched-on state and include a low resistance, resulting in reflection of the incoming RF signal by the switch. Thus, a simple high-frequency switching circuit is provided, in which photoconductive elements per se have a small size, and low optical power is used to irradiate them (i.e. low power is used to control the switch). Furthermore, the small size of the photoconductive elements relative to the circuit in general induces merely small losses in the propagation medium (dielectric). The parasitic capacitance of the switching photoconductive element is low. For example, if the photoconductive element is a piece of silicon with dimensions of 200 µm×200 µm×200 µm, its capacity computed using the formula for a parallel plate capacitor with electrodes of 200 µm×200 µm, inter-electrode distance of 200 µm, and specific dielectric constant of 12 is 0.02 pF, which is on the order of costly chip p-i-n diodes. Also, as shown above, this structure can be fully implemented in a printed circuit board. In addition, it is possible to separate the RF signal transmission/reception device from the control circuit, for example, by means of an optical fiber or a splitter, as long as the light source is separated from the photoconductive element, as described above with respect to FIG. 4.

Figures 6A, 6B:
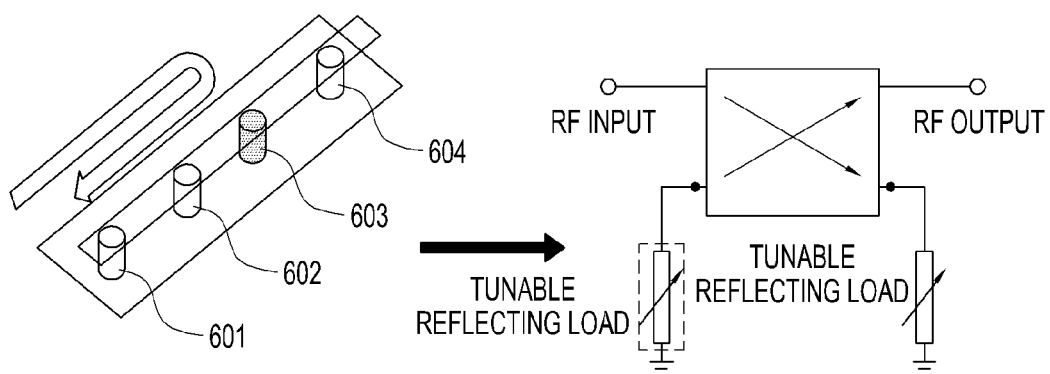
FIGS. 6A and 6B are views illustrating a second exemplary embodiment of a one-dimensional RF signal transmission/reception device according to various exemplary embodiments of the present disclosure.

FIGS. 6A and 6B are diagrams illustrating a second basic exemplary embodiment of a one-dimensional RF signal transmission/reception device according to the present disclosure. As illustrated in FIG. 6A, four photoconductive elements 601-604 may be arranged in a row along a strip line. The passage of a signal through the strip line can be controlled by switching on and off the photoconductive elements. For example, when photoconductive elements 601, 602 and 604 are switched off and the photoconductive element 603 is switched on, a signal passes through connection points of the photoconductive elements 601 and 602, but may be reflected at the connection point of the photoconductive element 603. Thus, a tunable reflective load for a low-loss phase shifter is implemented within the planar structure. FIG. 6B illustrates an example of the part of a phase shifter in which the same can be used.

Figures 7A, 7B:
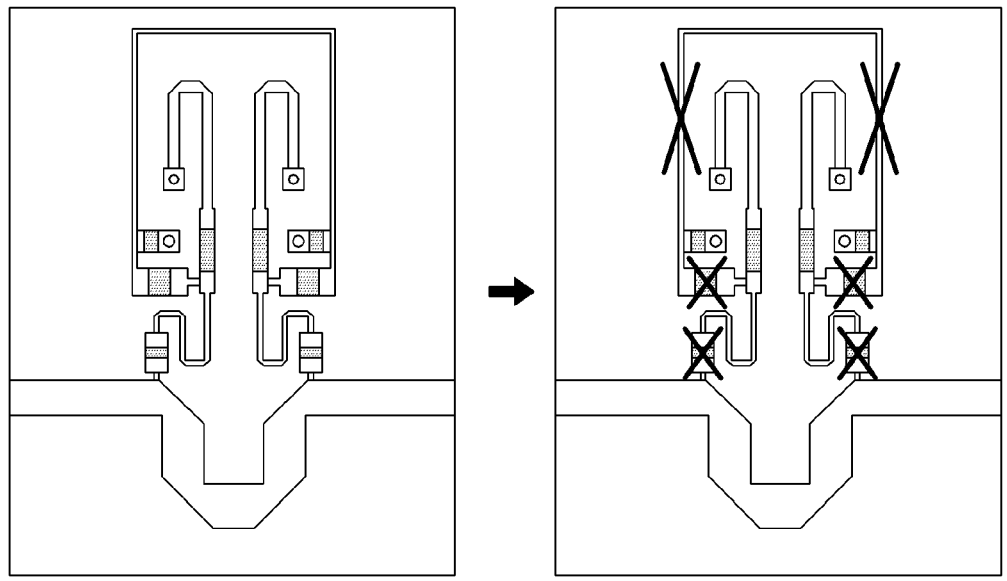
FIG. 7A is a view illustrating a related art of a phase shifter using an RF device based on photoconductive elements according to various exemplary embodiments of the present disclosure.
FIG. 7B is a view illustrating a phase shifter using an RF device based on photoconductive elements according to various exemplary embodiments of the present disclosure.

FIGS. 7A and 7B are views illustrating one section of a discrete phase shifter. As in FIG. 7A, in one section of the discrete phase shifter, the related art may include locking capacities, inductors, and segments of transmission lines used to isolate a signal channel from a control channel due to the use of an RF device based on photoconductive elements.

In contrast, as illustrated in FIG. 7B, in one section of a discrete phase shifter, due to the use of an RF device based on photoconductive elements in the present disclosure, the size and the number of elements may be reduced in contrast to common phase shifters having locking capacities, inductors, and segments of transmission lines used to isolate a signal channel from a control channel.

Figure 8A:
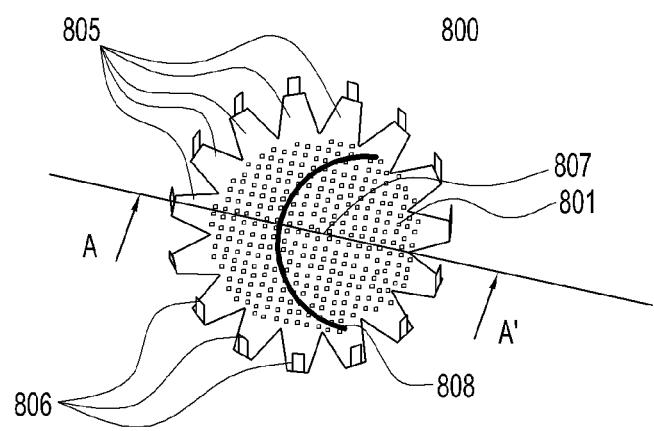
FIG. 8A is a view illustrating an antenna according to various exemplary embodiments of the present disclosure.
Figure 8B:
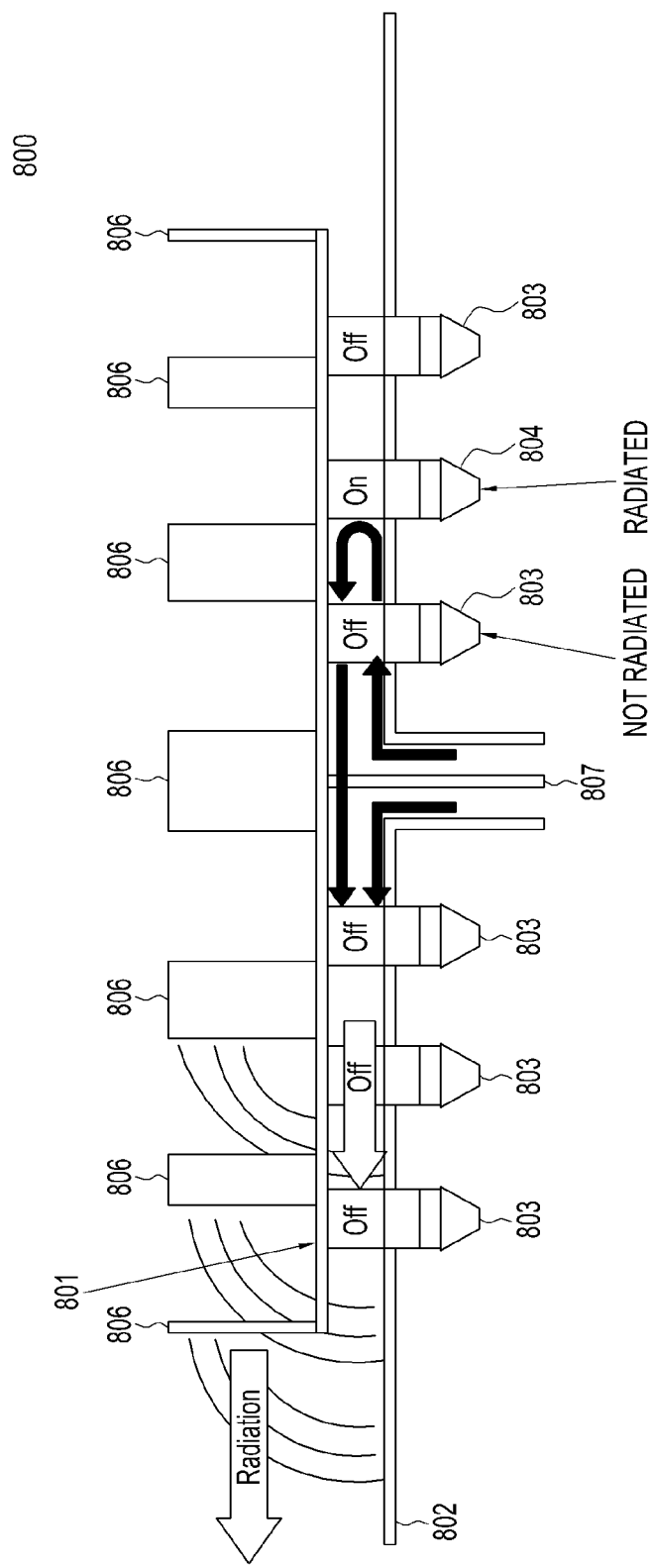
FIG. 8B illustrates a cross-sectional view taken along line A'-A' of FIG. 8A.
Figure 9:
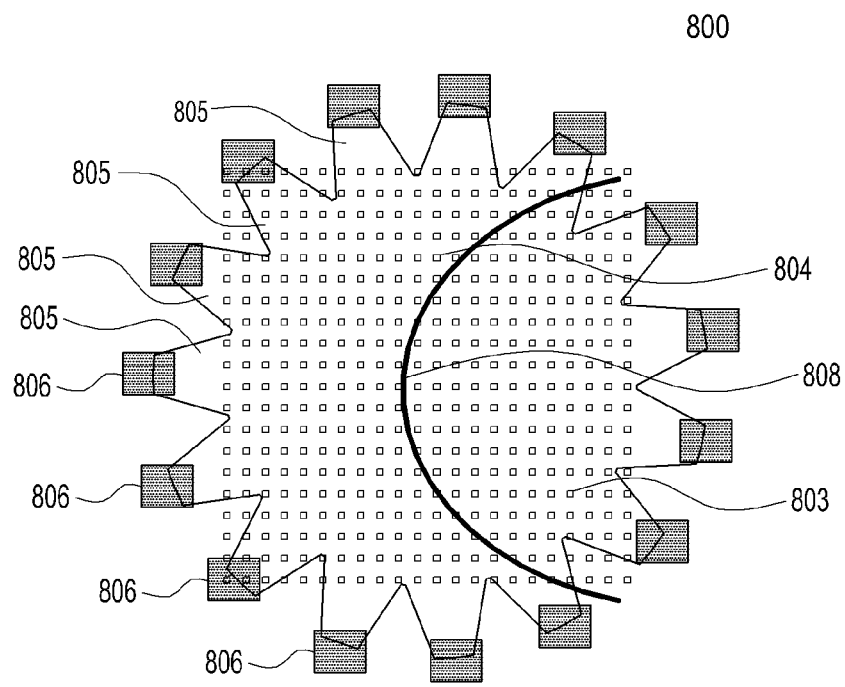
FIG. 9 is a view illustrating the arrangement of matching elements and loads in an RF device according to various exemplary embodiments of the present disclosure.
Figures 10A, 10B:
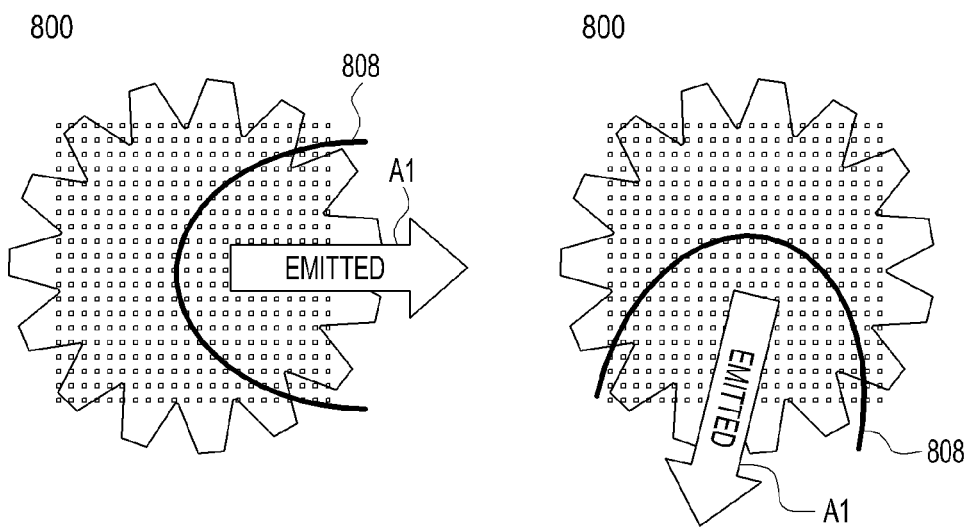
FIGS. 10A to 10D are views illustrating reflection profiles of an antenna for scanning according to various exemplary embodiments of the present disclosure.
Figure 10C:
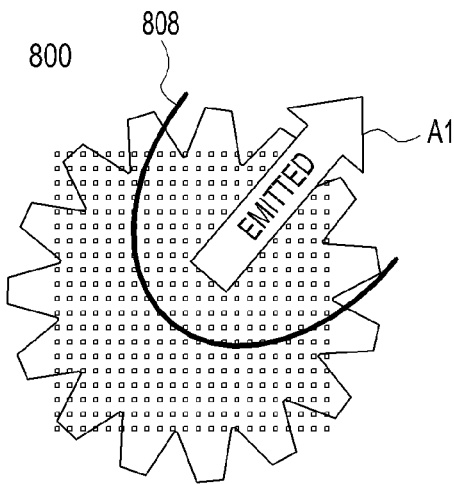
Figure 10D:
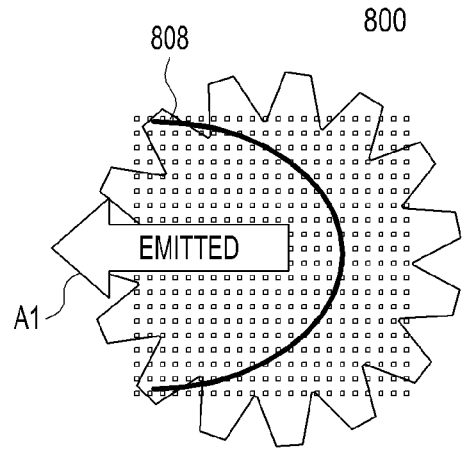

FIGS. 8A and 8B illustrate an antenna 800 based on a two-dimensional RF signal transmission/reception device according to the present disclosure. Photoconductive elements 803 and 804 are arranged in a grid (lattice or matrix) and the grid of the photoconductive elements 803 and 804 may be disposed between two conductive plates (electrodes) 801 and 802. The distance between the photoconductive elements should be smaller than half the wavelength of the excitation signal. The signal electrode 801 may consist of a round electrode (controlled reflector) and matching elements 805 for matching the reflector aperture with load elements 806. The load elements may be emitting elements, for example, quarter-wavelength monopole radiators in a vacuum, transmission lines, or high-frequency connectors for further radiation. The matching elements and load elements are disposed on the edge of the signal electrode, as illustrated in FIGS. 8A and 8B and FIG. 9. Their shape and size, density and location may be determined by the specific requirements for the antenna. In the exemplary embodiment illustrated in FIGS. 8A and 8B, the matching elements 805 may include the shape of teeth oriented with the narrow side out and disposed continuously along the entire circumference of the signal electrode, and a load element 806 such as a monopole radiator may be disposed at the end of each matching element.

The ground electrode 802 may extend beyond the signal electrode by a distance useful for operation of the radiator or by the height of the emitting element. In the center of the antenna 800, the ground electrode 802 may include a hole (or excitation feed point) through which excitation signal is fed to the antenna 800 via an excitation element 807. For example, the hole may be realized based on a coaxial structure including a center conductor connected to the signal electrode 801 and an external conductor connected to the ground electrode 802.

It should be noted that the ground electrode may be similar to the signal electrode; in this case, for example, a dipole radiator can be used, electrodes of which are connected to the signal and ground electrode.

By switching on and off the photoconductive elements 803-804 arranged in the grid, different reflection profiles may be created, which pass through curves connecting the switched-on photoconductive elements 804. A wave fed from the antenna center from the exciting element 807 may be reflected from the switched-on photoconductive elements 804, as shown above in FIG. 5, and travels in the opposite direction. Upon reaching the edge of the antenna, the wave is radiated due to including passed through the radiating element.

It is possible to change the radiation characteristics of the antenna by changing the shape of the reflection profile 808. That is, it may be possible to change the radiation pattern, including the gain, the directivity factor, and the existence of multiple beams.

FIGS. 10A to 10D illustrate examples of reflection profiles 808 of the antenna 800 of FIGS. 8A and 8B for scanning. In different cases, control of photoconductive elements is performed so as to switch on the photoconductive elements forming a parabolic reflection profile 808, in which the antenna 800 radiates in a particular predetermined direction (A1). Therefore, scanning can be performed by changing the reflection profile.

Figure 11A:
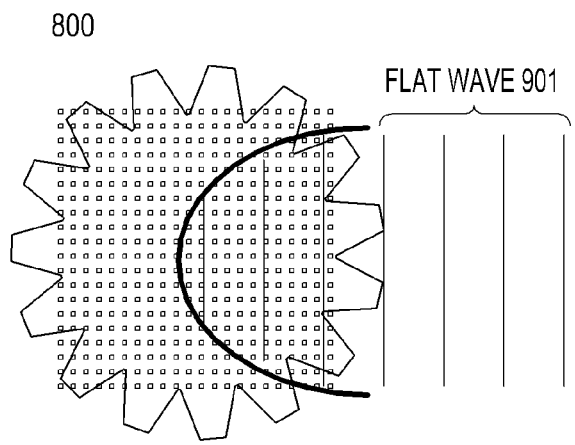
FIGS. 11A to 11D are views illustrating reflection profiles of an antenna for changing radiation characteristics according to various exemplary embodiments of the present disclosure.
Figure 11B:
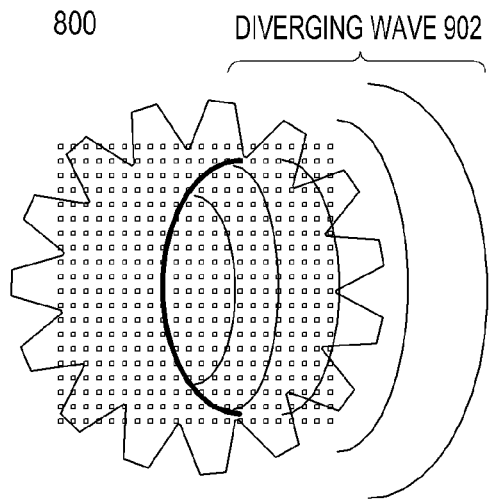
Figure 11C:
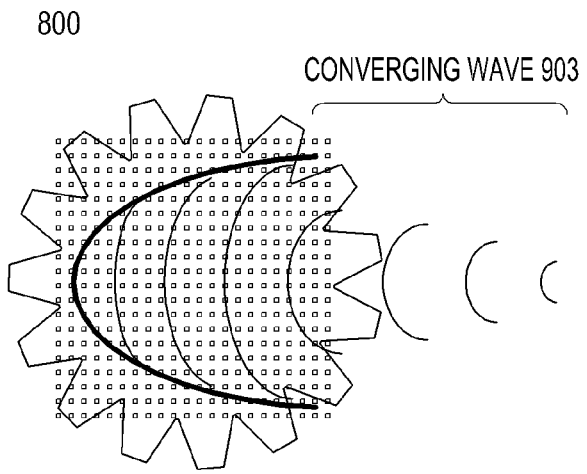

FIGS. 11A to 11D illustrate examples of reflection profiles 808 of the antenna 800 of FIGS. 8A and 8B for changing the radiation characteristics (A1). In different cases, control of photoconductive elements is performed so as to switch on the photoconductive elements forming the parabolic reflection profile, at which the antenna includes desired radiation characteristics. In particular, FIG. 11A is a view illustrating a flat wave 901 including a directivity pattern of the example of reflection profiles of the antenna, FIG. 11B is a view illustrating a diverging wave 902 including a directivity pattern of reflection profiles of the antenna 800, and FIG. 11C is a view illustrating a converging wave 903 including a directivity pattern of examples of reflection profiles of the antenna.

Figure 11D:
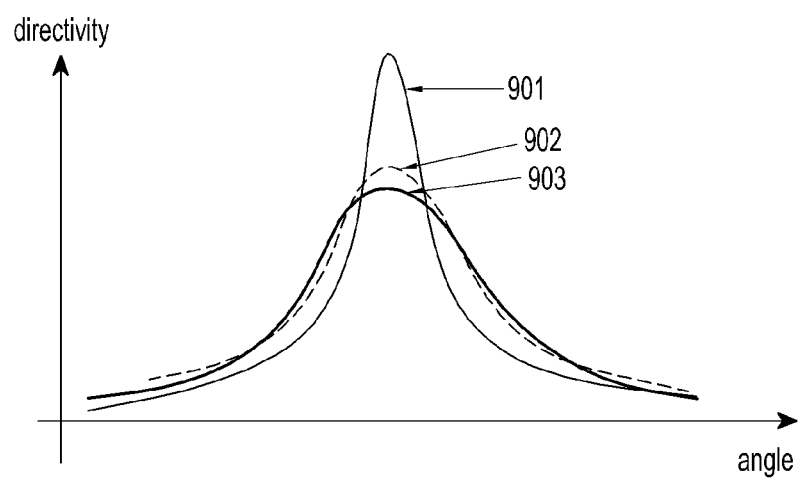

FIG. 11D is a graph showing the directivities and angles of the flat wave 901, diverging wave 902, and converging wave 903 including a directivity pattern.

Figure 12:
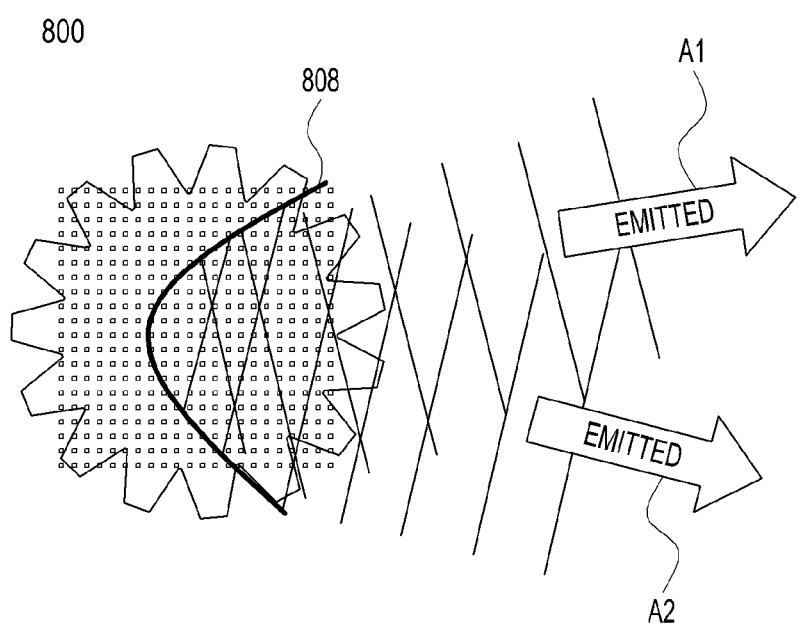
FIG. 12 is a view illustrating a reflection profile of an antenna for forming a multi-beam radiation pattern according to various exemplary embodiments of the present disclosure.

FIG. 12 illustrates an exemplary reflection profile 808 of the antenna 800 of FIGS. 8A and 8B for obtaining a multibeam radiation pattern. The reflection profile 808 may be formed such that rays A1 and A2 are radiated in different directions.

Therefore, a low loss antenna may be provided, which is implemented within the technology of planar structures, including printed circuit boards, has a scan angle of 360 degrees without reduction in the gain due to rotation of the beam, has controlled directivity patterns, including the ability to form a multi-beam radiation pattern, and is capable of near-field operation (focusing).

The antenna 800 illustrated in FIGS. 8A and 8B and FIG. 9 can be used as a multipole device for forming a predetermined phase distribution at output ports when a radio wave passing through a switch is not radiated in the air by radiating elements, but is transmitted further over a microstrip transmission line or to a high-frequency connector. Accordingly, the device can include the same advantages: small loss and 360-degree phase shift without a reduction in the transmission factor at the phase shift.

Figure 13:
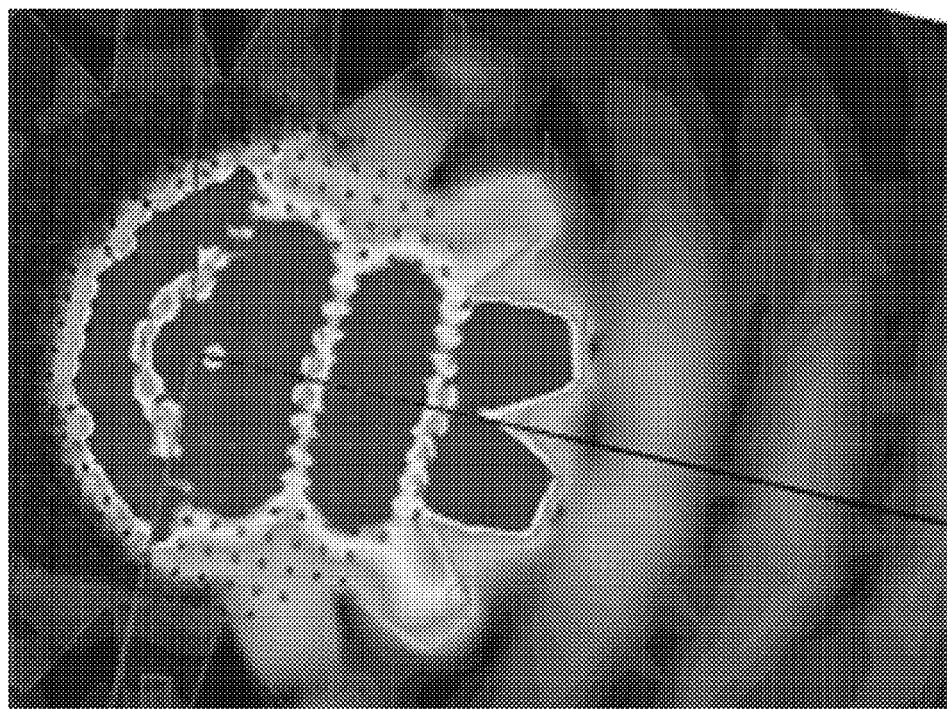
FIG. 13 is a view illustrating electric field distribution according to various exemplary embodiments of the present disclosure.

FIG. 13 illustrates an example of electric field distribution in the antenna 800 of FIGS. 8A and 8B in which a parabolic reflection profile 808 is formed. As seen, with the chosen profile and size at the frequency of 26 GHz, the antenna gain is 13 dBi if the ground electrode is an infinite conducting plane, and about 10 dBi with finite dimensions. The size of the signal electrode is 26 mm×26 mm and the height is 2.7 mm, the conductivity of photoconductive elements is 1000 Sm/m in switched-on state, the specific dielectric constant 12, and the dimensions are 0.2 mm×0.2 mm×0.2 mm.

Figure 14A:
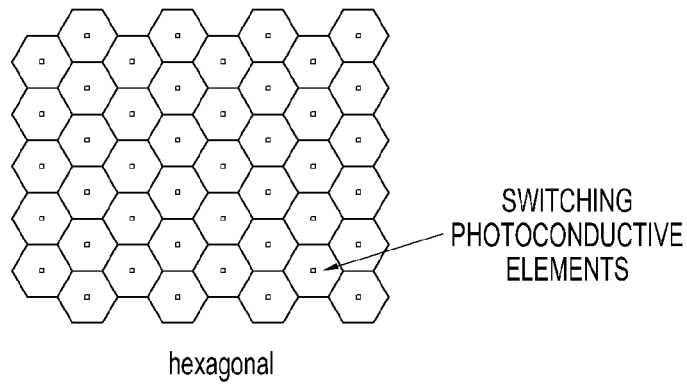
FIGS. 14A to 14C are views illustrating the arrangement of photoconductive elements in an antenna according to various exemplary embodiments of the present disclosure.
Figure 14B:
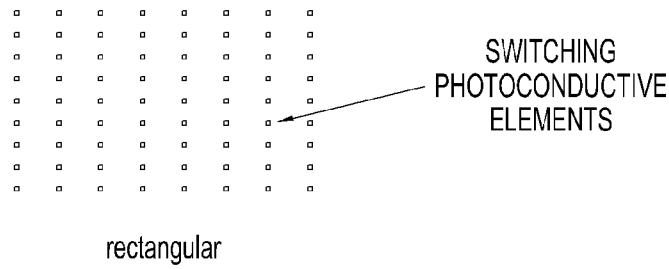
Figure 14C:
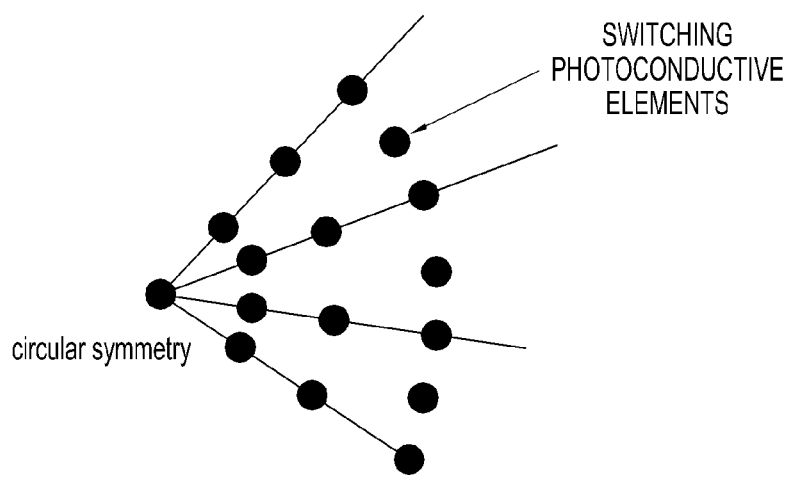

FIGS. 14A to 14C illustrate examples of arrangement of switching photoconductive elements in an antenna. For example, a grid of photoconductive elements may be hexagonal (illustrated in FIG. 14A), in which case photoconductive elements are disposed in centers of cells, rectangular (illustrated in FIG. 14B) having a circular symmetry (illustrated in FIG. 14C), etc. It is preferable to dispose photoconductive elements as accurately as possible along the desired reflection profile, so that the generated radiation pattern and respective radiation characteristics are close to requirements. Accordingly, the closer the actual position of photoconductive elements to the envelope of the desired profile, the more accurate may be the obtained radiation characteristics. The obligatory requirement for the arrangement of photoconductive elements is that the distance between them must be smaller than half the wavelength of the excitation signal. Thus, the greater the density of photoconductive elements in the grid, the closer the radiation characteristics are to the requirements, and the shorter the step of scanning. On the other hand, the smaller the number of photoconductive elements in the grid, the simpler and cheaper the antenna (may be). The arrangement of photoconductive elements may be chosen according to application details and requirements imposed on the antenna.

Figure 15:
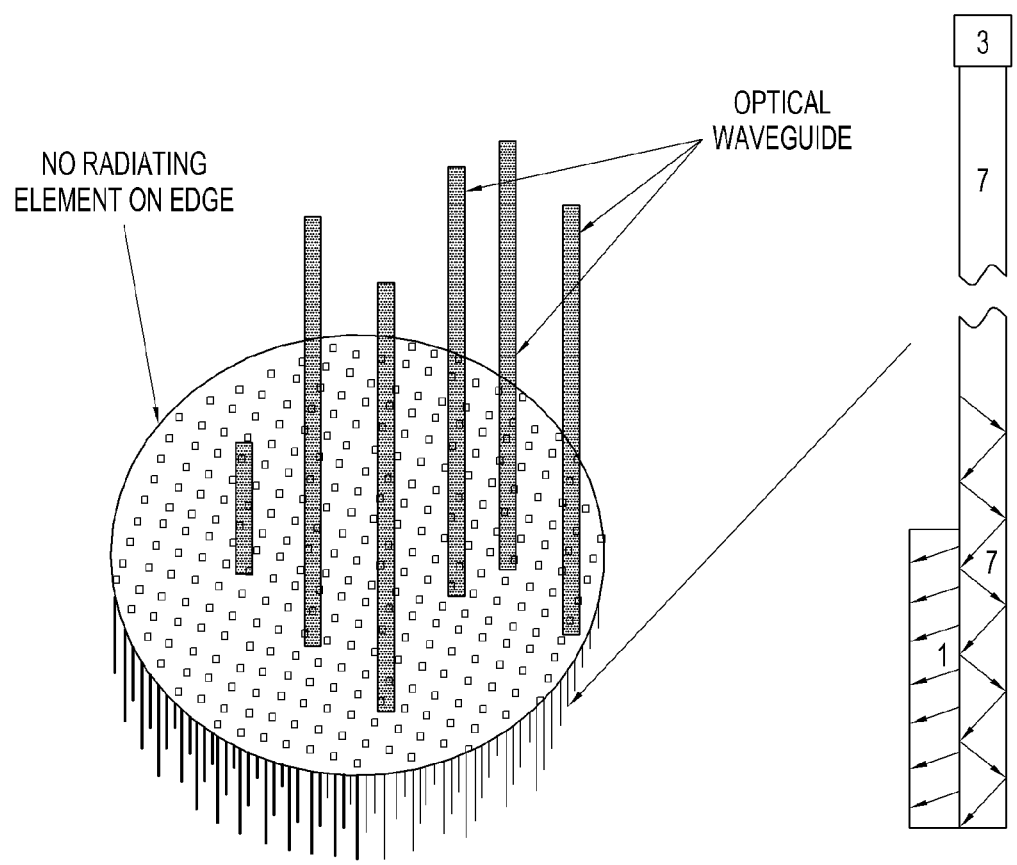
FIG. 15 is a view illustrating a full-sized antenna according to various exemplary embodiments of the present disclosure.

FIG. 15 illustrates an example of a full-sized antenna, in which the space between the ground and the signal electrode includes a thickness of about a quarter of the wavelength in a vacuum of a signal to be transmitted or received (for example, for a frequency of 28 GHz the thickness of the reflector under this condition should be approximately 2.5 mm). This thickness may be sufficient that a wave could be radiated directly from the reflector aperture. Accordingly, no matching elements and radiators may be required at the edges of the reflector. If the first exemplary embodiment of connection of photoconductive elements is used, the photoconductive elements pass across the entire thickness of the reflector, and thus also have a relatively large thickness. However, in this case no photoconductivity can be excited from the side of the signal electrodes because the finite penetration depth of light in the semiconductor is just hundreds of microns. To circumvent this limitation, excitation can be performed as illustrated in FIG. 15. The photoconductive element is in contact with the optical waveguide across the entire thickness of the reflector, and when a control light flux is fed through the optical waveguide, the optical leaky-wave mode is formed in the photoconductive element itself due to the difference in refractive indices (the optical waveguide includes a lower refractive index than the photoconductive element) and this allows switching the photoconductive element to a switched-on state. Also, side radiation from the optical waveguide can be formed with the aid of discontinuities and/or notches, etc., disposed in the place of contact of the photoconductive element with the optical waveguide.

Figure 16:
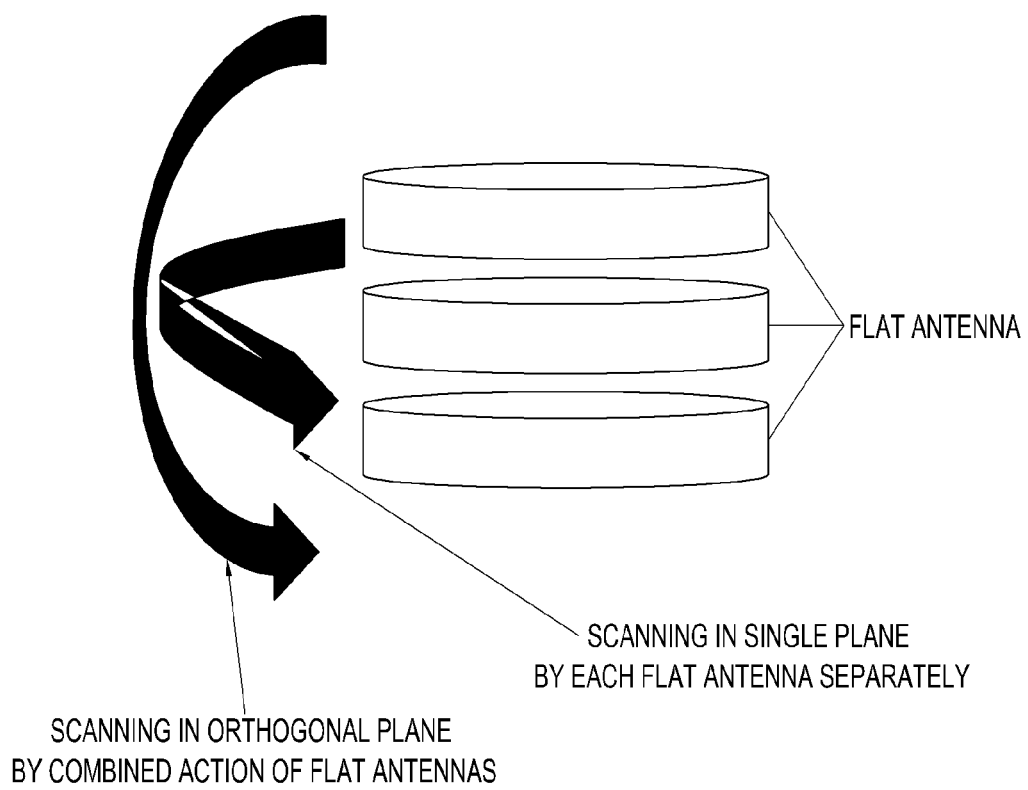
FIG. 16 is a view illustrating a three-dimensional antenna according to various exemplary embodiments of the present disclosure.

FIG. 16 illustrates a three-dimensional antenna consisting of a plurality of flat antennas, flat sides of which face each other, illustrated earlier in FIGS. 8A and 8B or FIG. 15. Each flat antenna can scan in the plane of its reflection profile. However, if the same signal with a different phase shift is fed to different flat antennas including the same reflection profile at a given instant, scanning can also be implemented in the plane perpendicular to the reflection profile plane. Accordingly, the resulting three-dimensional structure is capable of performing scanning in two planes.

Figure 17:
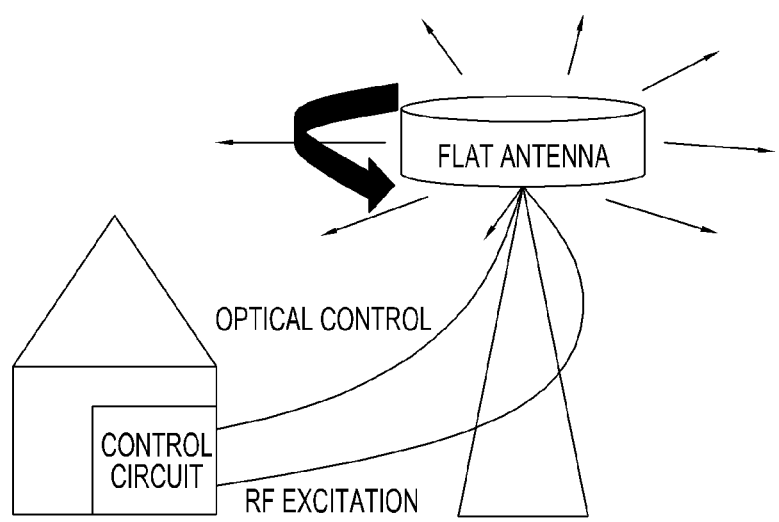
FIG. 17 is a view illustrating an example of application of an antenna in a base station according to various exemplary embodiments of the present disclosure.

FIG. 17 illustrates an example of application of the antenna of FIGS. 8A and 8B, FIG. 15 or FIG. 16 in a base station. The antenna itself is disposed on the base station tower, while the control circuits may be disposed at a remote unit from which the antenna receives RF excitation (for example, as mentioned above, over a coaxial cable) and control of photoconductive elements of the antenna (for example, as mentioned above, over an optical fiber). Due to this, control circuits can be placed indoors, thus simplifying the requirements for protecting the same from external effects.

It should be appreciated that this disclosure teaches the principle of construction and basic examples of RF devices based on photoconductive elements, and a skilled person, guided by this principle and examples, will be able to create other layouts of RF devices based on photoconductive elements without inventive effort.

For example, as mentioned above, the exciting element is located in the center of the antenna; however, if scanning is needed in a range less than 360 degrees, the excitation can be performed not in the center, but from an excitation signal feed point closer to the edge of the antenna. Furthermore, as mentioned above, the signal electrode has a circular shape, however, this is not the only option; for example, the signal electrode can have the shape of a polygon, a sector of a circle, etc. The shape of a triangle or a sector of a circle may be suitable for an antenna with a small desired scan angle.

RF devices based on photoconductive elements according to the present disclosure and strip lines, phase shifters, switches and antennas designed using the same can be employed in electronic devices, which require control of RF signals, for example, in advanced 5G millimeter-wave and WiGig® mobile networks, various sensors, Wi-Fi® networks, for the wireless transmission of power, including over long distances, in smart house systems, etc.

It should be understood that although such terms as "first", "second", "third", etc., may be used herein to describe various elements, components, regions, layers and/or sections, these elements, components, regions, layers and/or sections should not be construed as being limited by these terms. These terms are only used to distinguish one element, component, region, layer or section from another element, component, region, layer or section. Therefore, the first element, component, region, layer or section may be termed a second element, component, region, layer or section without going beyond the scope of the present disclosure. In the present description, the term "and/or" includes any and all combinations of one or more of the respective listed items. The elements referred to in the singular do not exclude a plurality of the elements, unless otherwise specified.

The functionality of an element specified in the description or the claims as a single element can be implemented in practice through several components of the device, and conversely, the functionality of the elements specified in the description or claims as a plurality of elements can be implemented in practice by a single component.

In an exemplary embodiment, the elements/units of the present antenna are disposed in a common housing, placed on the same frame/structure/printed circuit board and connected to each other structurally by mounting (assembly) operations and functionally via communication lines. The communication lines or channels, unless specified otherwise, are conventional communication lines, the material implementation of which does not require creative effort. A communication line may be a wire, set of wires, bus, path, or wireless communication link (inductive, radio-frequency, infrared, ultrasonic, etc.). Communication protocols over the communications links are known in the art and not disclosed separately.

The functional relationships between elements should be understood as the relationships that provide correct cooperation of these elements with each other and implements a particular functionality of the elements. Particular examples of such functional relationships may be a connection providing exchange of information, a connection providing transmission of electric current, a connection providing the transfer of mechanical motion, or a connection providing the transmission of light, sound, electromagnetic or mechanical vibrations, or the like. The specific form of functional relationship is determined by the nature of interaction of the elements, and, unless otherwise specified, is provided by well-known means using principles well-known in the art.

The structural embodiments of elements of the device are known to those skilled in the art and are not described separately in this document, unless otherwise specified. Elements of the antenna can be made of any suitable material. Elements of the antenna can be made of any suitable material. These components can be manufactured using known methods, including, merely by way of example, machining and lost-wax casting. Operations of assembly, connection and other operations in accordance with the above description also correspond to the knowledge of a person skilled in the art, and thus will not be explained here in detail.

Despite the fact that exemplary embodiments have been described in detail and shown in the accompanying drawings, it should be appreciated that such embodiments are merely illustrative and are not intended to limit the present disclosure and that the disclosure should not be limited to the specific shown and described layouts and designs, since various other modifications and embodiments of the disclosure, not exceeding the essence and scope of the disclosure, will be apparent to those skilled in the art based on the information contained in the description and on knowledge of the art.

Figure 18:
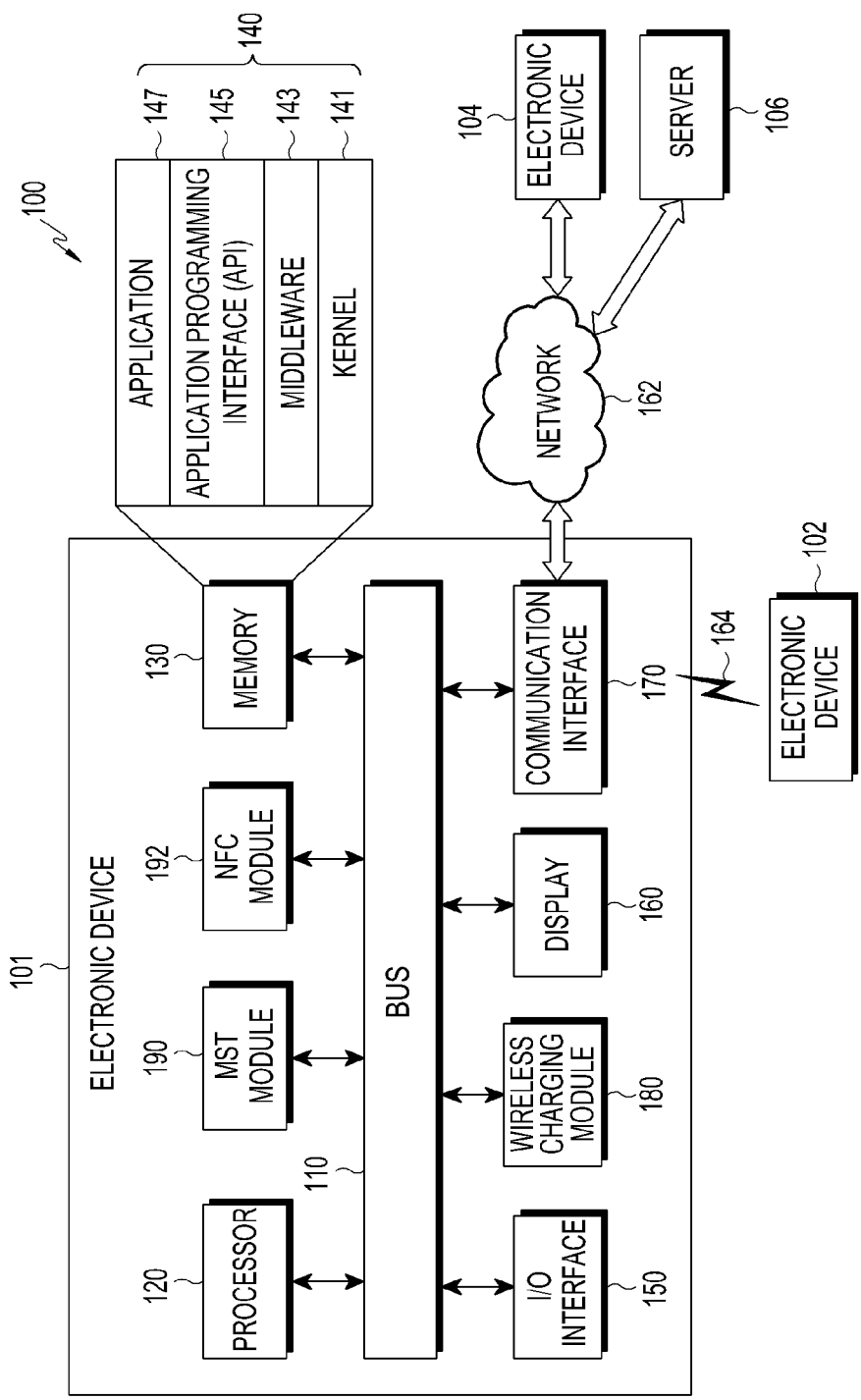
FIG. 18 is a block diagram illustrating a network environment including an electronic device according to various exemplary embodiments of the present disclosure.

Referring to FIG. 18, an electronic device in a network environment 100 according to various exemplary embodiments is provided. The electronic device 101 may include a bus 110, a processor 120, a memory 130, an I/O interface 150, a display 160, and a communication interface 170. Depending on exemplary embodiments, at least one of the components of the electronic device 101 may be removed, or other components may be additionally provided. The bus 110 may include a circuit that connects the components 110-170 to each other and transmits communication (for example, control messages or data) among the components. The processor 120 may include one or more of a central processing unit, an application processor, and a communication processor (CP). The processor 120, for example, can perform calculation or data processing related to control or communication of at least one other component of the electronic device 101.

The memory 130 may include volatile or nonvolatile memory. The memory 130, for example, can store instructions or data related to at least one other component of the electronic device 101. According to an exemplary embodiment, the memory 130 can store software or a program 140. The program 140, for example, may include a kernel 141, a middleware 143, an application programming interface (API) 145, or an application (or "app") 147 etc. At least some of the kernel 141, middleware 143, or API may be referred to as an operating system. The kernel 141, for example, can control or manage system resources (for example, the bus 110, processor 120, or memory 130 etc.) used to perform operations or functions implemented in other programs (for example, the middleware 143, API 145, or applications 147). Further, the kernel 141 can provide an interface that can control or manage system resources by accessing individual components of the electronic device 101 through the middleware 143, API 145, or applications 147.

The middleware 143, for example, can perform an intermediate function so that the API 145 or the applications 147 can transmit/receive data by communicating with the kernel 141. Further, the middleware 143 can process one or more work requests received from the applications 147 in order of priority. For example, the middleware 143 can give priority to be able to use the system resources (for example, the bus 110, processor 120, or memory 130) of the electronic device 101 to at least one of the applications 147, and process the at least one or more work requests. The API 145, which is an interface for the applications 147 to control functions provided from the kernel 141 or the middleware 143, may include at least one interface or function (for example, command), for example, for file control, window control, image processing, character control, etc. The I/O interface 150, for example, can transmit instructions or data input from a user or other external devices to other component(s) of the electronic device 101 or can output instructions or data received from other component(s) of the electronic device 101 to a user or other external devices.

The display 160, for example, may include a liquid crystal display (LCD), a light-emitting diode (LED) display, an organic light-emitting diode (OLED) display, a micro electromechanical system (MEMS) display, or an electronic paper display. The display 160, for example, can display various contents (for example, text, images, video, icons, symbols etc.) to a user. The display 160 may include a touch screen, and for example, can receive a touch, a gesture, approach, or hovering input by an electronic pen or a part of the user's body. The communication interface 170, for example, can set communication between the electronic device 101 and an external device (for example, a first electronic device 102, a second electronic device 104, or a server 106). For example, the communication interface 170 may communicate with an external device (for example, the second electronic device 104 or the server 106) by being connected to a network 162 through wireless communication or wired communication.

The wireless communication, for example, may include cellular communication that uses at least one of LTE™, LTE-A (LTE Advanced), CDMA (code division multiple access), WCDMA (wideband CDMA), UMTS (universal mobile telecommunications system), WiBro (wireless broadband), and GSM (global system for mobile communications). According to an exemplary embodiment, the wireless communication, as exemplified as element 164 in FIGS. 1A and 1B, may include, for example, at least one of 5G millimeter-wave and WiGig® mobile network, Wi-Fi® (wireless fidelity), Li-FI (light fidelity), Bluetooth®, Bluetooth® low energy (BLE), ZigBee®, NFC (nearfield communication), Magnetic Secure Transmission, Radio Frequency (RF), and Body Area Network (BAN). According to an exemplary embodiment, the wireless communication may include GNSS. The GNSS, for example, may be a GPS (global positioning system), a GLONASS (global navigation satellite system), a BeiDou navigation satellite system (hereinafter, referred to as "BeiDou"), or Galileo, a European global satellite-based navigation system. Hereinafter, "GPS" and "GNSS" may be interchangeably used. The wired communication may include, for example, at least one of a USB (universal serial bus), an HDMI® (high definition multimedia interface), an RS-232 (recommended standard 232), power line communication, or a POTS (plain old telephone service). The network 162 may include a telecommunication network, for example, at least one of a computer network (for example, LAN or WAN), the internet, and a telephone network.

The first and second external electronic devices 102 and 104 may be the same kind of device as the electronic device 101, or may be different (kinds of devices) therefrom. According to various exemplary embodiments, all or some of the operations of the electronic device 101 may be performed by another different electronic device or a plurality thereof (for example, the electronic devices 102 and 104 or the server 106). According to an exemplary embodiment, when the electronic device 101 needs to perform a predetermined function or service automatically or in response to a request, the electronic device 101 may request at least some functions related to the function or service from other devices (for example, the electronic devices 102 and 104 or the server 106) additionally or instead of performing the function or service itself. Other devices (for example, the electronic devices 102 and 104 or the server 106) can perform the requested functions or additional functions and transmit the result to the electronic device 101. The electronic device 101 can provide requested functions or services by providing the received result as it is or after performing additional processing thereon. To this end, for example, cloud-computing, distributed-computing, or client-server-computing technology may be used.

A wireless charging module 180 can receive wireless power from a wireless power receiver or transmit wireless power to other electronic devices. The wireless charging module 180 can receive or transmit wireless power on the basis of an induction method or a resonance method. The wireless charging module 180 may include a coil for transmitting/receiving wireless power.

An MST module 190, for example, may be an individual module separate from the communication interface 170. The MST module 190 may perform MST communication with another electronic device. For example, the MST module 190 can emit an electromagnetic field, the intensity of which is changed as time passes, to transmit signals including information. The information may include information for wireless settlement. Other electronic devices described above, for example, a POS terminal, can receive signals including information from the electronic device 101 by detecting a change in intensity according to time of the electromagnetic field. The MST module 190 may include a coil for emitting or detecting an electromagnetic field. The MST module 190 may receive signals from other electronic devices by detecting a change over time in an electromagnetic field received from other electronic devices.

A nearfield communication (NFC) module 192 may include, for example, at least one of a cellular module, a Wi-Fi® module, a Bluetooth® module, a GNSS module, an NFC module, and an RF module. The nearfield communication module may be provided, for example, as an individual module separate from the communication interface. According to an exemplary embodiment, operation modes can be changed in accordance with control of the nearfield communication module 192. The processor can transmit/receive data to/from external electronic devices by controlling the nearfield communication module.

While the present disclosure has been shown and described with reference to certain embodiments thereof, it will be understood by those skilled in the art that various changes in form and details may be made therein without departing from the spirit and scope of the present disclosure as defined by the appended claims.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A high-frequency signal transmission/reception device, comprising:
    a signal electrode that includes a form of a flat conductive plate and includes a plurality of matching elements disposed along an edge thereof;
    a ground electrode that includes a form of a flat conductive plate and is disposed parallel to the signal electrode;
    a dielectric layer between the signal electrode and the ground electrode;
    a plurality of photoconductive elements, each of which is electrically connected to the signal electrode and the ground electrode, arranged in a grid;
    an excitation signal feed point; and
    a plurality of load elements that are electrically connected to the plurality of matching elements, wherein:
    the photoconductive elements are included in two states, the two states including a dielectric state with a low intrinsic electrical conductivity (switched-off state) in absence of a control light flux, and a conductor state with a relatively high electrical conductivity (switched-on state) in presence of a control light flux,
    the photoconductive elements in the grid are arranged such that the photoconductive elements, to which a control light flux is applied at a given instant, form a curve close to a desired reflection profile of an excitation signal transmitted by the device, which is supplied from the excitation signal feed point,
    a distance between adjacent photoconductive elements is less than a half of a wavelength of the excitation signal, and
    at least one of the signal or ground electrodes includes holes for providing control light fluxes to the photoconductive elements or for mounting conductive elements that connect the photoconductive element with another electrode.

2. The device of claim 1, further comprising:
    a plurality of dielectric transparent splitters including dielectrics, each of which is connected to a respective photoconductive element; and
    a plurality of light sources, each of which is connected to a respective splitter so that radiated light from the plurality of light sources, passing through the respective splitter, falls on a respective photoconductive element.

3. The device of claim 1, further comprising:
    a plurality of optical waveguides, each of which is connected to a respective photoconductive element; and
    a plurality of light sources, each of which is connected to a respective optical waveguide so that radiated light from the plurality of light sources, passing through the optical waveguide, falls on a respective photoconductive element.

4. The device of claim 1, wherein the signal electrode includes a shape of a circle, polygon or a circular sector.

5. The device of claim 1, wherein the plurality of matching elements each include a saw tooth shape.

6. The device of claim 1, wherein the load elements are monopole quarter-wave radiators,
    the device is an antenna, and
    the ground electrode extends beyond the signal electrode by a distance useful for operation of the radiators.

7. The device of claim 1, wherein the load elements are transmission lines or high-frequency connectors, and
    the device includes a multipole device with controllable phase distribution at output ports thereof.

8. The device of claim 1, wherein at least one photoconductive element is connected to the signal electrode via a conductive jumper that is connected to the signal electrode, passes through a hole in the dielectric layer or the ground electrode, and has no contact with the ground electrode.

9. The device of claim 1, wherein:
    at least one photoconductive element is disposed in a hole in the dielectric layer and includes a thickness equal to a thickness of said dielectric layer, and
    the ground electrode includes a hole to provide a control light flux to said at least one photoconductive element.

10. The device of claim 1, wherein the signal electrode, the ground electrode and the dielectric layer between them represent, respectively, a signal plane, a ground plane and a substrate of a planar structure.

11. The device of claim 1, wherein:
    the device is a three-dimensional antenna including at least two flat antennas, flat sides of which face each other, and
    the three-dimensional antenna scans in a plane perpendicular to a plane of the flat antennas by supplying a same signal with different phase shift to different flat antennas including a same reflection profile.

12. A high-frequency signal transmission/reception device, comprising:
    a signal electrode that includes a form of a flat conductive plate;
    a ground electrode that includes a form of a flat conductive plate and is disposed parallel to the signal electrode;
    a dielectric layer that is disposed between the signal electrode and the ground electrode and includes a thickness of not less than a quarter wavelength of a signal to be transmitted/received;
    a plurality of photoconductive elements that are arranged in holes in the dielectric layer and are arranged in a grid;
    a plurality of optical waveguide portions, each of which is in contact with a respective photoconductive element across a thickness of the dielectric layer and provides a control light flux thereto; and
    an excitation signal feed point, wherein:
    the photoconductive elements are each electrically connected to the signal electrode and the ground electrode, includes a thickness equal to the thickness of the dielectric layer, are included at least in two states, the two states including a dielectric state with a low intrinsic electrical conductivity (switched-off state) in absence of a control light flux, and a conductor state with a relatively high electrical conductivity (switched-on state) in presence of a control light flux,
    the photoconductive elements in the grid are arranged such that the photoconductive elements, to which a control light flux is applied at a given instant, form a curve close to a desired reflection profile of an excitation signal transmitted by the device, which is supplied from the excitation signal feed point,
    a distance between adjacent photoconductive elements is less than a half of a wavelength of the excitation signal, and at least one of the signal or ground electrodes includes holes to supply optical waveguides to the photoconductive elements.

13. The device of claim 12, further comprising a plurality of light sources that are each connected to a respective optical waveguide portion so that radiated light from the plurality of light sources passing through the optical waveguide falls on a respective photoconductive element.

14. The device of claim 12, wherein discontinuities and/or notches are provided on optical waveguide portions at a place of contact with a photoconductive element.

15. A high-frequency signal transmission/reception device, comprising:
   a signal electrode that includes a plurality of matching elements;
   a ground electrode that is disposed parallel to the signal electrode;
   a dielectric layer between the signal electrode and the ground electrode;
   a plurality of photoconductive elements, each of which is electrically connected to the signal electrode or the ground electrode, and each of which is distanced from each other;
   an excitation signal feed point; and
   a plurality of load elements that are electrically connected to the plurality of matching elements, wherein:
   each of the photoconductive elements includes a dielectric state with a low intrinsic electrical conductivity (switched-off state) in absence of a control light flux, and a conductor state with a high electrical conductivity (switched-on state) in presence of a control light flux, and
   the photoconductive elements are arranged in a grid or a matrix such that the photoconductive elements, to which a control light flux is applied, form a curve close to a desired reflection profile of an excitation signal transmitted by the device, which is supplied from the excitation signal feed point, wherein the curve has one side open,
   wherein a control input is applied to the photoconductive elements in the form of a light flux.

16. The device of claim 15, wherein a distance between adjacent photoconductive elements is less than a half of a wavelength of the excitation signal, and
   at least one of the signal electrode or the ground electrode includes holes for providing control light fluxes to the photoconductive elements or for mounting conductive elements that connect the photoconductive elements with an other of the signal electrode or the ground electrode.

17. The device of claim 15, wherein the signal electrode or the ground electrode includes a form of a flat conductive plate.

18. The device of claim 15, wherein the plurality of matching elements are disposed along an edge of the signal electrode.

19. The device of claim 15, wherein the plurality of matching elements comprise a tooth shape that is oriented with a narrow side out and disposed continuously along an entire circumference of the signal electrode.

* * * * *